United States Patent

[11] 3,630,624

[72] Inventors Hendrik DeLang
Delft;
Gijsbertus Bouwhuis, Emmasingel,
Eindhoven, both of Netherlands
[21] Appl. No. 882,530
[22] Filed Dec. 5, 1969
[45] Patented Dec. 28, 1971
[73] Assignee U.S. Philips Corporation
New York, N.Y.
[32] Priority Dec. 5, 1968
[33] Netherlands
[31] 6817430

[54] ARRANGEMENT FOR DETERMINING THE RELATIVE DISPLACEMENT OF AN OBJECT BY MEANS OF AN ELEMENT RIGIDLY SECURED TO THE OBJECT
2 Claims, 2 Drawing Figs.

[52] U.S. Cl. ........................................................ 356/169, 250/231
[51] Int. Cl. ................................................. G01b 11/04
[50] Field of Search .......................................... 356/170, 169; 250/231, 237 G, 232

[56] References Cited
UNITED STATES PATENTS

| | | | |
|---|---|---|---|
| 3,454,776 | 7/1969 | Hock............................ | 250/232 |
| 3,482,107 | 12/1969 | Hock............................ | 356/169 X |
| 3,489,908 | 1/1970 | Hock et al. .................. | 250/237 G |
| 3,502,415 | 3/1970 | Hock............................ | 250/232 X |

Primary Examiner—Ronald L. Wibert
Assistant Examiner—T. Major
Attorney—Frank R. Trifari

ABSTRACT: An arrangement for determining the relative displacement of an object by means of an element which is rigidly secured to the object and influences a beam of radiation emerging from a source of radiation is discussed, which arrangement further comprises a radiation modulator and an optical system which are inserted in the path of the radiation, the radiation ultimately impinging upon a photoelectric detector in which a signal is produced when the object is displaced.

It is set forth that for this purpose periodic signals from a signal generator are applied to the electric circuit which processes the electric signals produced in the detector, the modulation signals applied to the radiation modulator being obtained by frequency division of the periodic signals.

It is described that the ratio between the frequency of the periodic signals and the frequency of the modulation signals is a fraction.

PATENTED DEC 28 1971

3,630,624

INVENTORS
H. DELANG
G. BOUWHUIS
BY
Frank R. Trifari
AGENT

| # ARRANGEMENT FOR DETERMINING THE RELATIVE DISPLACEMENT OF AN OBJECT BY MEANS OF AN ELEMENT RIGIDLY SECURED TO THE OBJECT

The invention relates to an arrangement for determining the relative displacement of an object by means of an element which is rigidly secured to the object and influences a beam of radiation emerging from a source of radiation, which arrangement further comprises a radiation modulator and an optical system which are inserted in the path of the radiation, the radiation ultimately impinging upon a photoelectric detector in which a signal is produced when the object is displaced.

An arrangement of the above-mentioned kind is known. The element influencing the beam of radiation may be a reflector included in one of the arms of an interferometer, cf. for example Dutch Pat. application No. 6,515,207 (PHN. 1256). The said element may alternatively be a grating, cf. for example British Pat. application No. 997,405 (PH. 16,786). In the latter case, for reasons of manufacture a grating having a large period may be preferable to a grating having a small period. In the case of radial gratings, small diameter gratings are preferable to large diameter gratings because of their comparatively small mass. However, a comparatively large grating period then will have to be accepted.

As a result, the accuracy with which the displacement of the object is measured may in certain cases become too low.

It is an object of the present invention to obviate this disadvantage by the use of a method of interpolation in which the detector receives low-frequency modulated signals which are interpolated by means of high-frequency clock pulses, the low-frequency signals being derived from the clock pulses by frequency division. For this purpose, the invention is characterized in that periodic signals from a signal generator are applied to the electric circuit which processes the electric signals generated in the detector, the modulation signals applied to the radiation modulator being obtained by frequency division of the periodic signals.

The phase of the signals produced in the photodetector includes the desired information about the displacement of the object. In the electric processing circuit, this phase is determined by comparing the phase of electric pulses with clock pulses which are independent of the displacement of the object. When the frequency of the clock pulses is higher than the frequency of the measuring pulses, this gives rise to an increased measuring accuracy if the two frequencies are in a fixed mutual ratio N. For digital signals this condition can most readily be satisfied by using a frequency divider. The fraction or integer N is the ratio between the signal frequency and the modulation frequency.

An important advantage of the arrangement according to the invention is that the periodicity of the signals from the signal generator is not influenced by imperfections of the modulators. A further advantage is that digital electronic apparatus for frequency division is less complicated than that for frequency multiplication.

An embodiment of the invention will be described, by way of example, with reference to the accompanying diagrammatic drawing, in which.

Figure 1:
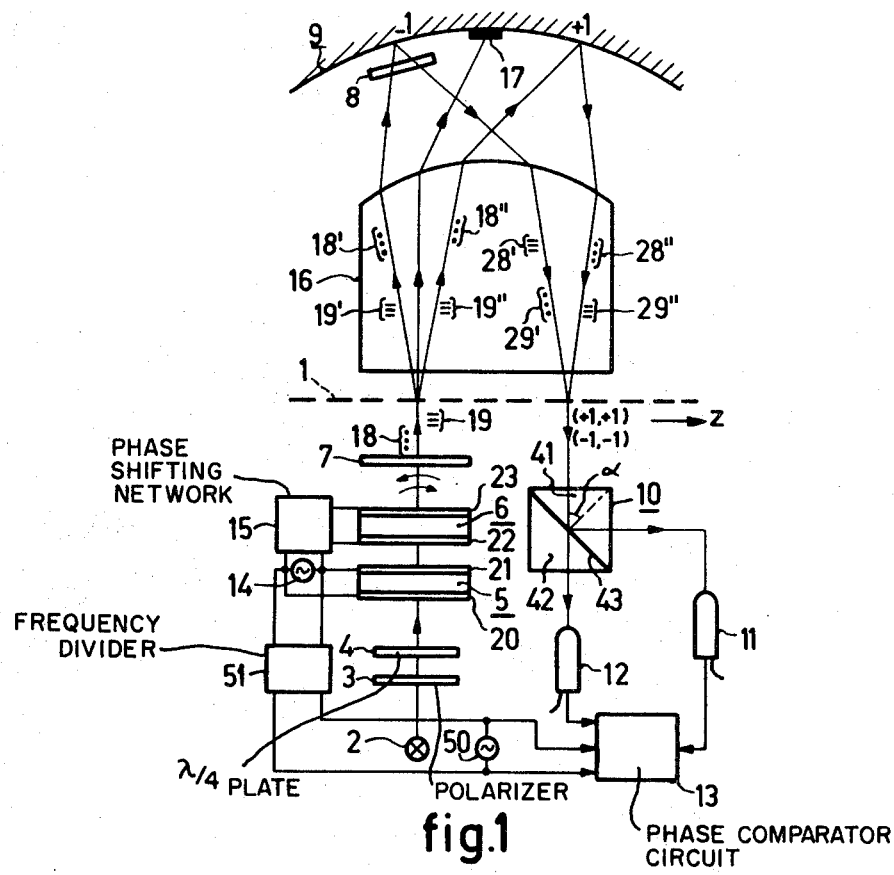
FIG. 1 shows an embodiment of an arrangement according to the invention.

In FIG. 1, reference numeral 1 designates a displaceable grating, the grating lines of which are assumed to be normal to the plane of the drawing. The grating 1 is rigidly secured to the object (not shown) the displacement of which is to be measured. The light at an angular frequency $\omega$ from a source of light 2 is converted by a polarizer 3 into plane polarized light. The plane polarized light rays, only one of which is shown for the sake of clarity, are converted into circularly polarized rays by a $\lambda/4$ plate 4 in the principal direction of which is at an angle of 45° to the direction of polarization of the polarizer 3. The circularly polarized rays pass through two electro-optical crystals 5 and 6 which are arranged in series and the principal directions of which are at an angle of 45° to one another and which may be made of potassium dihydrogen phosphate ($KH_2PO_4$). Between electrodes 20 and 21 and between electrodes 22 and 23 of the crystals 5 and 6, respectively, axial electric fields of a value $A_o \sin\Omega t$ and $A_o \cos\Omega t$ respectively, are applied by means of an alternating voltage source 14 and a phase shifting network 15.

If the amplitudes of the voltages applied to the crystals 5 and 6 are suitably chosen, the light emerging from the series arrangement of the two crystals is plane polarized light the plane of polarization of which rotates at a substantially constant angular velocity $\Omega/2$. In other words: the light emerging from the crystals comprises two components, i.e., a circularly polarized beam 18 of angular frequency $\omega$ and a circularly polarized beam of 19 of angular frequency $\omega-\Omega$. One beam displays left-handed rotation, the other right-handed rotation.

The circularly polarized beams 18 and 19 transverse a $\lambda/4$ plate 7, which converts them into two beams which are polarized at right angles to one another and have a frequency difference of $\Omega$.

The grating 1 divides the mutually perpendicularly polarized beams into coherent subbeams. Especially subbeams of the orders $-1, 0$ and $+1$ are produced. The subbeams pass through a planoconvex lens 16 to impinge on a concave mirror 9. Since the center of curvature of the convex face of the lens 16 coincides with the center of curvature of the concave mirror 9, the rays which are reflected from the mirror and then refracted at the convex face of the lens 16 are parallel again to the rays traversing the lens 16 in the direction of the mirror 9. The subbeam of zero order is rendered inoperative by coating the mirror 9 with an absorbing layer 17.

A $\lambda/4$ plate 8 is inserted in diagonal position in the path of the subbeam of the order $-1$. A subbeam 18' of angular frequency $\omega$ having a direction of polarization at right angles to the plane of the drawing, after passing through the $\lambda/4$ plate 8, being reflected at the mirror 9 and passing again through the $\lambda/4$ plate 8 has been converted into a beam 28' of angular frequency $\omega$ having a direction of polarization parallel to the plane of the drawing, for the beam has effectively traversed a $\lambda/2$ plate in diagonal position. Similarly, a subbeam 19' of angular frequency $\omega-\Omega$ having a direction of polarization parallel to the plane of the drawing is converted into a subbeam 29' of angular frequency $\omega-\Omega$ having a direction of a polarization at right angles to the plane of the drawing.

Subbeams 18'' and 19'' of the order $+1$ are reflected by the reflector 9. A subbeam 29'' produced from the subbeam 19'' obviously retains the angular frequency $\omega-\Omega$ and the same direction of polarization, i.e., parallel to the plane of the drawing. A subbeam 28'' produced from the subbeam 18'' retains the angular frequency $\omega$ and the same direction of polarization, i.e., at right angles to the plane to the drawing.

All the subbeams, namely 28', 28'', 29' and 29'', are again diffracted at the grating 1. The directionally coincident coherent beams of the order $(-1,-1)$ produced from the subbeams 28' and 29' and those of the order $(+1,+1)$ produced from the subbeams 28'' and 29'' impinge on a beam-splitting prism 10 which comprises two parts 41 ad 42 which are cemented together along an interface 43 which is correctly oriented relative to he principal direction of the $\lambda/4$ plate 7 and, for example, is normal to the plane of the drawing. The interface 43 may be provided with a reflective coating comprising thin layers of alternatively high and low indices of refraction. The angle of incidence $\alpha$ of the coherent beams of the interface 43 is chosen so that at the interfaces between the layers of high and low indices of refraction the light impinges approximately at the Brewster angle. By suitably choosing the thickness of the layers the light of which the direction of vibration is in the plane of the drawing, is largely transmitted and the light of which the direction of vibration is at right angles to the plane of drawing, is largely reflected.

The transmitted light comprises a component at frequency $\omega$ and a component at frequency $\omega-\Omega$, one component ($\omega$) being derived from the beam of the order $(-1,-1)$ and the other (ω+Ω) from the beam of the order (−1,+1). A similar condition applies to the reflected light, however, in this case the component at the frequency ω−Ω is derived from the beam of the order (+1,−1) and the component at the frequency ω from the beam of the order (+1,+1).

It can be shown that signals $I_1$ and $I_2$ produced at a detector 11 and a detector 12 by the reflected and transmitted light, respectively, can be written:

$I_1 = $ const $ + a \sin(\Omega t - 8\Omega z/p)$ and
$I_2 = $ const $ + b \sin(\Omega t + 8\pi z/p)$ respectively.

In these expressions, $a$ and $b$ represent the amplitudes of the alternating components of the signals $I_1$ and $I_2$, respectively.

$z = $ the displacement of the grating,
$p = $ the period of the grating.

When the passages through zero of he photosignals are converted into electric signals which are applied to an electric circuit 13, it will be clear that each displacement $\Delta z = p/8$ provides an additional pulse.

The arrangement hitherto described forms part of copending U.S. Pat. application No. 847,903, filed Aug. 6, 1969.

According to the invention, an alternating voltage source 14 is formed by dividing the frequency of the output of a generator 50 by means of a frequency divider 51. The generator 50 generates a pulse voltage having an angular frequency $N\Omega$. This voltage is applied not only to the frequency divider 51 but also to the electric circuit 13.

Figure 2:
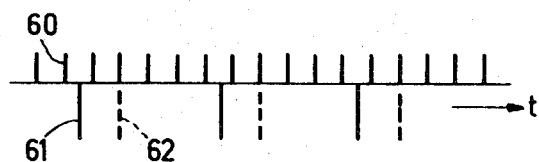
FIG. 2 is a diagram illustrating the operation of the arrangement shown in FIG. 1.

In FIG. 2, the so-called clock pulses at angular frequency $N\Omega$ are shown as short vertical lines 60 and the measuring pulses are shown as long vertical lines 61. When the raster is displaced through a distance $\Delta z'$ the measuring pulses are also displaced. The new positions of the measuring pulses are shown by broken lines 62. In the example of FIG. 2, $N=5$. A measuring step of about $1/5 \cdot p/8 = 1/40$ is obtained.

N may assume any constant value. For example, if N is chosen to be a suitable fraction, a measuring step based on the inch may be converted into a measuring step expressed in millimeters or microns. Further, in an interferometer the wavelength value of the light used, which may be produced by a laser, can be converted into microns. Also on an angular measuring system, an angular measurement expressed in radians may be converted to an angular measurement expressed in degrees.

Obviously, the step according to the invention may also be used in the other arrangements described in Dutch Pat. application No. 6,811,152 (PHN 3360) and also in those described in prior Dutch Pat. application No. 6,813,749 (PHN 3534).

What is claimed is:

1. An arrangement for determining the relative displacement of an object, comprising a radiation source, a grating rigidly connected to the object and positioned in the path of the radiation from the source, oscillator means for providing repetitive signal at a fixed frequency, digital means for dividing the frequency of the signal from the oscillator means by a constant greater than one, optical means connected to the digital means and positioned in the path of the radiation passing through the grating for modulating the polarization of the radiation in response to the signals from the digital means, photoelectric detector means for converting radiation passing through the optical means and the grating into electrical signals, and comparator means connected to the photoelectric detector means and to the oscillator means for comparing the oscillator signal with the phase of the signals from the optical means modulated at a frequency equal to a fraction of the frequency of the signal from the oscillator means.

2. An arrangement as claimed in claim 1, wherein the ratio of the frequency of the oscillator means to the frequency of the output signal from the digital means is an integer.

* * * * *